United States Patent
Chen et al.

(10) Patent No.: US 8,699,675 B2
(45) Date of Patent: Apr. 15, 2014

(54) METHOD AND APPARATUS FOR EXCHANGING INFORMATION IN A VOICE COMMUNICATION SYSTEM

(75) Inventors: Shao-Fong Chen, Taipei Hsien (TW); Sheng-Ta Hsieh, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 489 days.

(21) Appl. No.: 12/764,973

(22) Filed: Apr. 22, 2010

(65) Prior Publication Data
US 2010/0322398 A1 Dec. 23, 2010

(30) Foreign Application Priority Data
Jun. 22, 2009 (TW) .............................. 98120838 A

(51) Int. Cl.
*H04M 1/64* (2006.01)
(52) U.S. Cl.
USPC .............. 379/88.19; 379/142.05; 379/388.02; 455/411
(58) Field of Classification Search
USPC ............. 379/88.13, 93.02, 421, 88.01, 88.02, 379/88.19, 142.05, 228, 232, 247, 388.02, 379/388.03; 370/342; 726/5; 455/411; 381/86; 705/67; 713/168
See application file for complete search history.

(56) References Cited

U.S. PATENT DOCUMENTS

| | | | |
|---|---|---|---|
| 7,324,645 B1 | 1/2008 | Juopperi | |
| 8,019,078 B2* | 9/2011 | Chavez et al. | 379/421 |
| 2007/0147327 A1* | 6/2007 | Jin et al. | 370/342 |
| 2007/0226784 A1* | 9/2007 | Ueda et al. | 726/5 |
| 2008/0279366 A1* | 11/2008 | Lindbergh | 379/421 |

FOREIGN PATENT DOCUMENTS

| | | | |
|---|---|---|---|
| CN | 1617605 A | 5/2005 | |
| GB | 2268370 A * | 1/1994 | ............. H04M 1/72 |
| TW | 200520480 | 6/2005 | |

OTHER PUBLICATIONS

Office action mailed on May 22, 2012 for the China application No. 200910148029.3, p. 3 line 4~12, line 18~20, line 23~25, line 28~29.
Office action mailed on Sep. 26, 2012 for the Taiwan application No. 098120838, p. 2 line 3-15 and line 18-20 and line 25-26 and p. 3 line 1-12.

* cited by examiner

*Primary Examiner* — MD S Elahee
(74) *Attorney, Agent, or Firm* — Winston Hsu; Scott Margo

(57) ABSTRACT

The present invention provides a method for exchanging information in a voice communication system, which includes a first communication device establishing a communication connection with a second communication device, and the first communication device exchanging digital data with the second communication device for achieving a specific function in a specific interval; wherein the specific interval is an interval that the first communication device does not exchange voice signals with the second communication device.

31 Claims, 6 Drawing Sheets

METHOD AND APPARATUS FOR EXCHANGING INFORMATION IN A VOICE COMMUNICATION SYSTEM

BACKGROUND OF THE INVENTION

1. Field of the Invention

The present invention relates to a method and apparatus for exchanging information in a voice communication system, and more particularly, to a method and apparatus capable of enhancing security and practicality of communication.

2. Description of the Prior Art

Due to the development of telecommunication technology, ways of calculating communication fees, such as on-net, off-net, periods, regions, international calls, etc., are more and more complicated. Conventionally, communication fees can be calculated according to phone numbers to be dialed, but such method is no longer workable duo to service of number portability, NP. NP service allows a user to change a service provider without changing an original phone number. In other words, a phone number originally belonging to a certain service provider can be served by another service provider after NP. Therefore, the user cannot determine whether a phone number to be dialed is on-net or off-net. Under such circumstance, the user can determine communication fees based on call records from the service provider, or via system inquiry, e.g. calling for system service, which is quite inconvenient and time-consuming.

Besides, in regard to showing incoming numbers, evildoers may call the user, fake caller ID display to impersonate a relative of the user, tearfully speak a kidnapping event, and ask for ransom money. Under the current telecommunication network, the user cannot instantly check the reality of the caller except calling back, leading to fraud calls and insecurity.

SUMMARY OF THE INVENTION

It is therefore an objective of the present invention to provide a method and apparatus for exchanging information in a voice communication system.

The present invention discloses a method for exchanging information in a voice communication system, which includes a first communication device of the voice communication system establishing a communication connection with a second communication device; and the first communication device exchanging digital data with the second communication device, to achieve a specific function in a specific interval; wherein the specific interval is an interval that the first communication device does not exchange voice signals with the second communication device.

The present invention further discloses a voice communication system, which includes a communication network, and a plurality of communication devices. A first communication device of the plurality of the communication devices establishes a communication connection with a second communication device of the plurality of communication devices through the communication network and exchanges digital data with the second communication device in a specific interval after the communication connection is established; wherein the specific interval is an interval that the first communication device does not exchange voice signals with the second communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
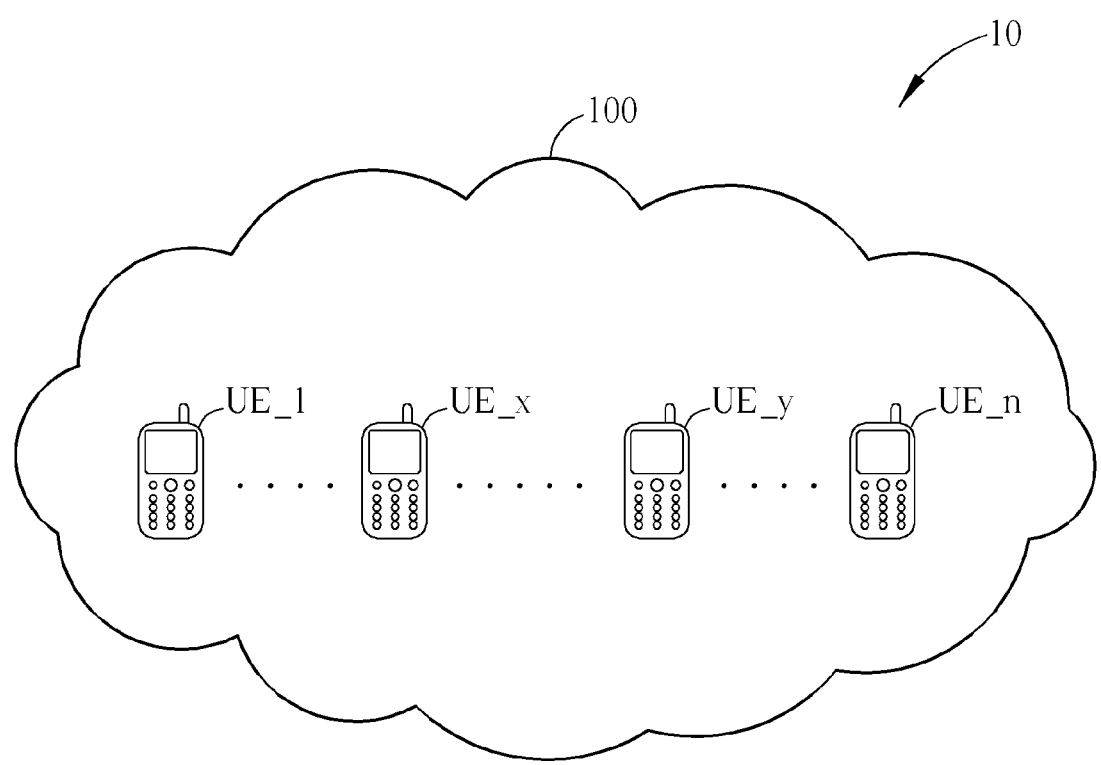
FIG. 1 is a schematic diagram of a voice communication system according to an embodiment of the present invention.
Figure 2:
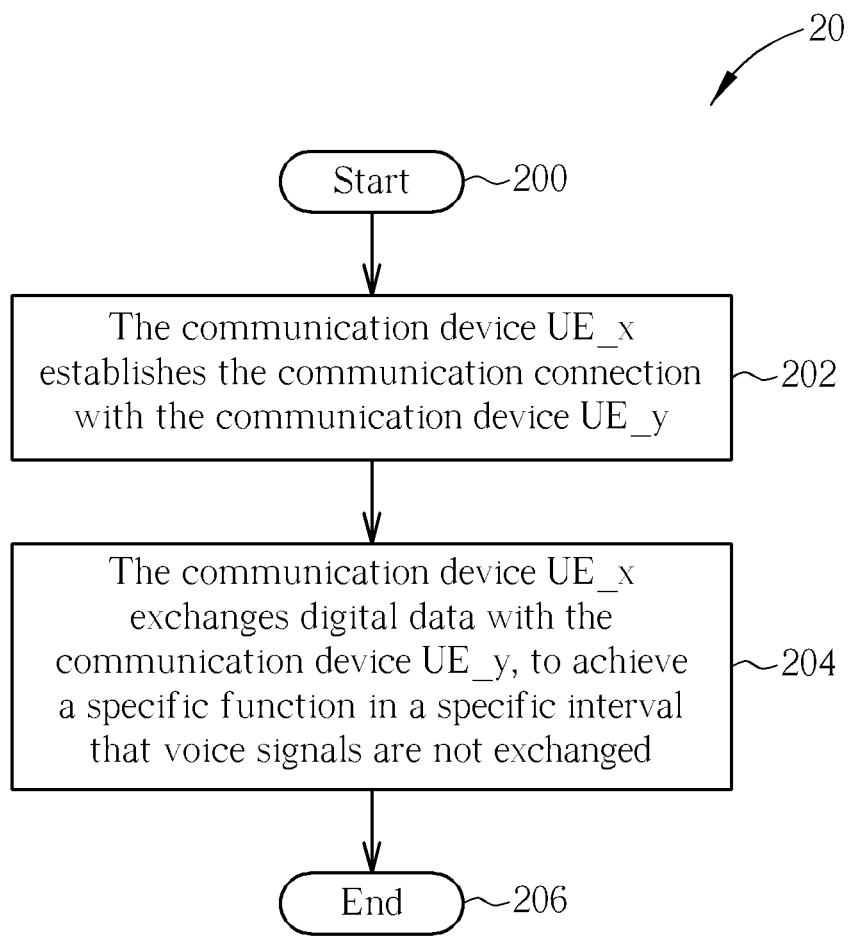
FIG. 2 is a schematic diagram of an information exchanging process according to an embodiment of the present invention.

Please refer to FIG. 1, which is a schematic diagram of a voice communication system 10 according to an embodiment of the present invention. The voice communication system 10 includes a communication network 100 and communication devices UE_1-UE_n. In the voice communication system 10, each of the communication devices UE_1-UE_n can establish a communication connection with another communication device. In addition, after a communication device UE_x establishes a communication connection with a communication device UE_y, the communication devices UE_x and UE_y can activate exchanging of digital data in a specific interval that voice signals are not exchanged, e.g. the first second after the communication connection is established, voice pause, short mute, etc, operations of which can be summarized into an information exchanging process 20, as shown in FIG. 2. The information exchanging process 20 includes the following steps:

Step 200: Start.

Step 202: The communication device UE_x establishes the communication connection with the communication device UE_y.

Step 204: The communication device UE_x exchanges digital data with the communication device UE_y, to achieve a specific function in a specific interval that voice signals are not exchanged.

Step 206: End.

Figure 3:
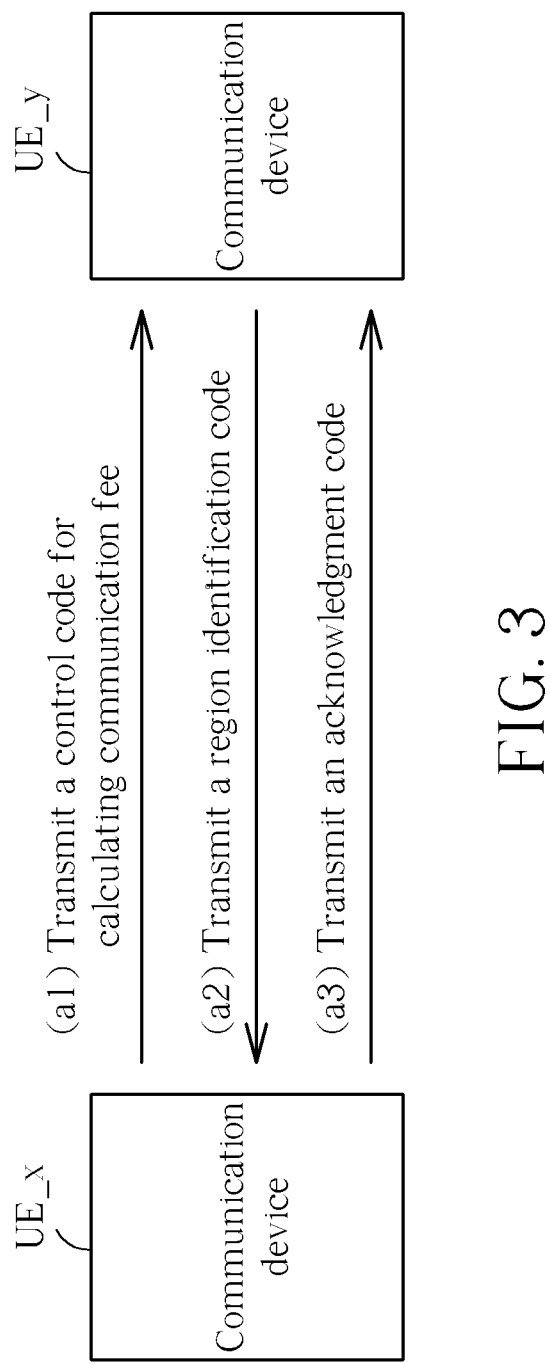
FIG. 3 is a schematic diagram of a communication fee calculating function according to an embodiment of the present invention.

In a word, after the communication device UE_x establishes the communication connection with the communication device UE_y, these two communication device can utilize the interval that voice signals are not exchanged for exchanging digital data, so as to achieve default functions, such as communication fee calculating, authentication, data exchanging, etc. For example, please refer to FIG. 3, which is a schematic diagram of a communication fee calculating function according to an embodiment of the present invention. After the communication device UE_x establishes the communication connection with the communication device UE_y, in the interval that voice signals are not exchanged, e.g. the first second after the communication connection is established, voice pause, short mute, etc., the communication device UE_x transmits a control code for calculating communication fee to the communication device UE_y, to activate the communication fee calculating function (step a1). Then, the communication device UE_y transmits a region identification code back to the communication device UE_x (step a2). The region identification code preferably includes a mobile country code (MCC), a mobile network code (MNC), a check code and the control code, etc. After receiving the region identification code, the communication device UE_x checks if any errors occur according to the check code, and transmits an acknowledgment (ACK) code to the communication device UE_y if no error is found (step a3), to complete exchanging of communication fee data, and resume voice communication. Meanwhile, the communication device UE_x can display an estimated communication fee on a display screen according to a service fee rate (including in-net, off-net, local calls, international calls, messages, etc.) of a service provider corresponding to the communication device UE_y, and determines whether to keep communicating according to a user decision or a predetermined rule, e.g. to disconnect when the communication fee or communication time is high.

Therefore, by utilizing the communication fee calculating function, the user can precisely and instantly calculate communication fee without inquiring service providers, to avoid excessive communication fees charged by the service provider, and prevent unawareness of making an international roaming call or attended transfer call, so as to effectively enhance practicability and convenience.

Figure 4:
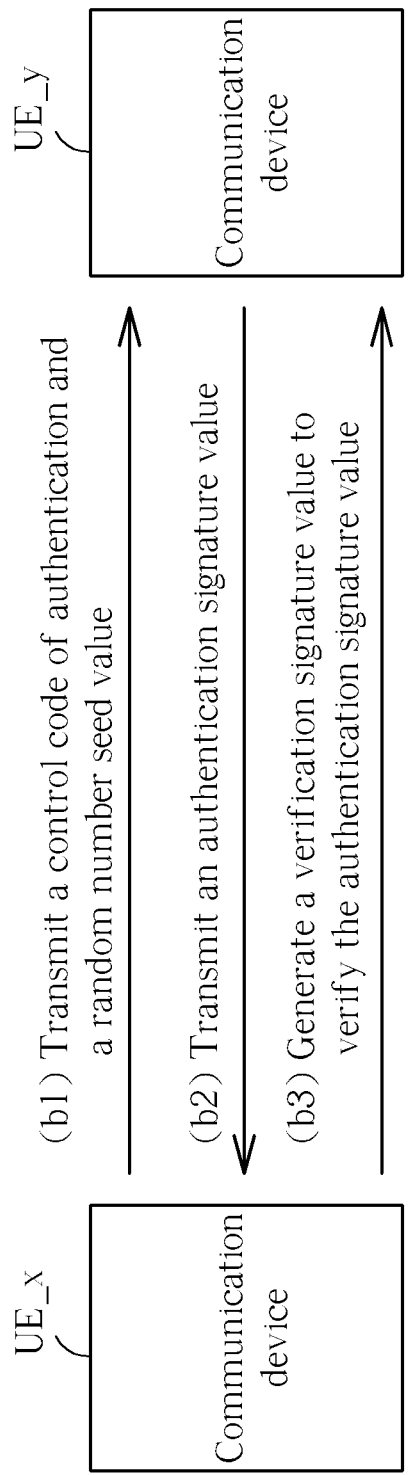
FIG. 4 is a schematic diagram of an authentication function according to an embodiment of the present invention.

Please refer to FIG. 4, which is a schematic diagram of an authentication function according to an embodiment of the present invention. First, the communication device UE_x presets an exclusive key value and shares it to the communication device UE_y, and the communication device UE_y stores a phone number and the key value of the communication device UE_x. Then, after the communication device UE_x establishes the communication connection with the communication device UE_y, if the communication device UE_x intends to authenticate the communication device UE_y, the communication device UE_x uses an interval that voice signals are not exchanged, e.g. the first second after the communication connection is established, voice pause, short mute, etc., to transmit a control code of authentication and a random number seed value to the communication device UE_y, to activate the authentication function (step b1). After receiving the control code of authentication and the random number seed value, the communication device UE_y performs encryption and decryption on the stored key value and the random seed value, then performs an Message-Digest Algorithm 5 (MD5) operation to generate an authentication signature value, and transmits an identification code composed of the authentication signature value and a check code to the communication device UE_x (step b2). At the same time, the communication device UE_x also performs encryption and decryption on the key value and the random number seed value, and performs MD5 to generate a verification signature value. After receiving the identification code, the communication device UE_x transmits an acknowledgement code if no error is found according to the check code, and compares the authentication signature value with the verification signature value, to verify the communication device UE_y (step b3). If the authentication signature value conforms to the verification signature value, the communication device UE_x determines that the communication device UE_y is successfully authenticated. On the contrary, if the authentication signature value does not conform to the verification signature value, the communication device UE_x determines that the communication device UE_y is not authenticated. Finally, an authentication result is displayed on a screen of the communication device UE_x, and the communication device UE_x can determine whether to resume communicating according to a user decision or predetermined rule.

Furthermore, to prevent stealing of authentication data, the authentication function can include encryption techniques, such as one-time password, RSA algorithm, etc., to enhance information security. Since the random seed value is generated as the authentication function is triggered, the corresponding identification code during transmission is different, which can effectively block fraud calls having fake caller IDs, and prevent stealing of authentication data, to ensure communication security.

Figure 5:
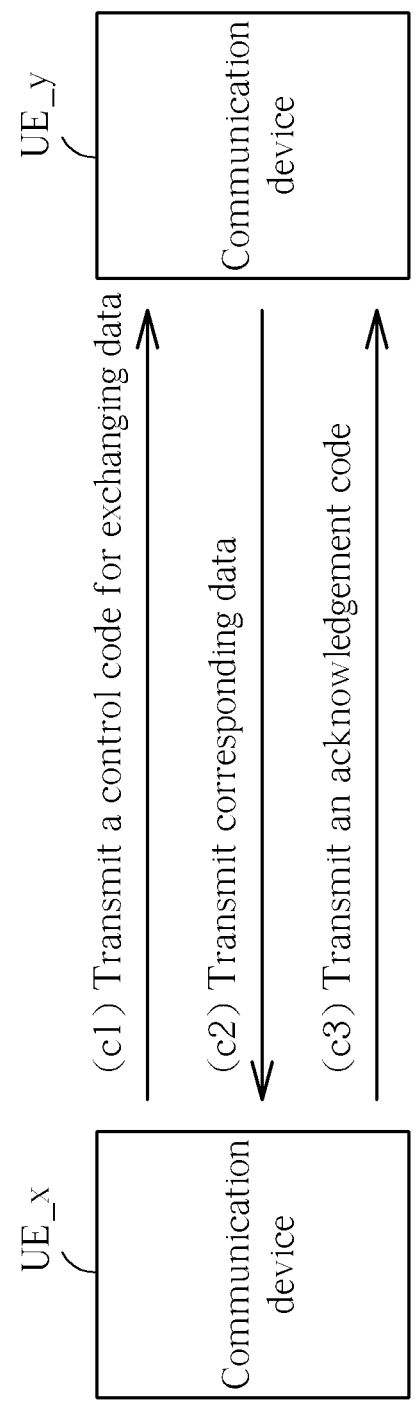
FIG. 5 is a schematic diagram of a data exchanging function according to an embodiment of the present invention.

Please refer to FIG. 5, which is a schematic diagram of a data exchanging function according to an embodiment of the present invention. The communication device UE_y presets an exclusive key value and shares it to the communication device UE_x, and the communication device UE_x stores a phone number and the key value of the communication device UE_y. Then, after the communication device UE_x establishes the communication connection with the communication device UE_y, if the communication device UE_x intends to get specific data of the communication device UE_y, such as personal data, GPS information, messages, etc., the communication device UE_x uses an interval that voice signals are not exchanged, e.g. the first second after the communication connection is established, voice pause, short mute, etc., to transmit a control code for exchanging data to the communication device UE_y, to activate the data exchanging function (step c1). After receiving the control code, the communication device UE_y determines whether to transmit data requested by the communication device UE_x according to a predetermined communication rule. If the communication device UE_y determines to respond data requested by the communication device UE_x, the communication device UE_y performs encryption on the data and transmits the encrypted data plus related information (such as the control code, data length, check code, etc.) to the communication device UE_x (step c2). After receiving the encrypted data, the communication device UE_x transmits an acknowledgement code back to the communication device UE_y if no error is found according to the check code (step c3), and utilizes the stored key value to decrypt and store data, so as to complete the data exchanging function.

Using the data exchanging function, the user can exchange data during communication, which avoids inconvenience of inputting data, and reduces cost. Besides, data to be exchanged can belong to a variety of types, including personal data, GPS data, messages, E-mails, etc., while information security is maintained by encryption on the exchanged data.

Therefore, when the communication device UE_x does not exchange voice signals with the communication device UE_y, the two communication devices can activate exchanging of digital data, so as to achieve communication fee calculation, authentication, data exchanging, etc. Certainly, except these functions, those skilled in the art can make modifications or alterations according to different requirements, to achieve other functions. Beside, noticeably, operations to exchange digital data between the communication device UE_x and the communication device UE_y are not limited to specific processes or steps, and can utilize techniques of dual tone multi-frequency (DTMF), frequency-shift keying (FSK), etc. A transmission rate of DTMF is about 12.5 tones per second, while a transmission rate of FSK is about 150 bytes per second. Take DTMF having a slower transmission rate for example, tones are composed of 16 keys (0~9, A~D, *, and #) and can be transformed into hexadecimal characters, i.e. one key is 0.5 bytes (4 bits), such that 6-byte data can be transmitted in one second. If digital data to be exchanged is communication fee calculation data, the amount of exchanging data during the communication fee calculating function is 5.5 bytes, including:

0.5 bytes—the control code for calculating communication fee transmitted by the communication device UE_x, 4.5 bytes—MCC (1.5 bytes), MNC (1.5 bytes), the check code (1 byte) and the control code (0.5 bytes) in the region identification code transmitted by the communication device UE_y, and 0.5 bytes—the acknowledgement code transmitted by the communication device UE_x.

As a result, the communication fee calculating function can be completed in one second.

On the other hand, if digital data to be exchanged is authentication data, the control code of authentication (0.5 bytes) and the random number seed value (1 byte) transmitted by the communication device UE_x require 1.5 bytes, while the identification signature value (16 bytes) and the check code (1 byte) transmitted by the communication device UE_y require 17 bytes. Therefore, DTMF needs 3.6 seconds to transmit 18.5 bytes of the authentication data, while FSK needs 0.12 seconds.

Moreover, if digital data to be exchanged is data exchanging data(encrypted Chinese name with 6 bytes), the control code for exchanging data transmitted by the communication device UE_x requires 0.5 bytes, while the control code for exchanging data (0.5 bytes), data length (2 bytes), data(encrypted Chinese name with 6 bytes), and the check code (1 byte) transmitted by the communication device UE_y require 9.5 bytes. Therefore, DTMF needs 2 seconds to complete the data exchanging function, while FSK needs 0.06 seconds.

Note that, DTMF and FSK are exemplary embodiments of the present invention, and other audio coding technologies can also be applied. Besides, the communication devices can be realized by mobile phones, PSTN (public switched telephone network) phones, VOIP (voice over internet protocol) phones, etc., as long as the phones utilizes DTMF, FSK, or the likes, in order to reduce upgrade cost and enhance convenience.

In addition, since the communication device UE_x and the communication device UE_y utilize the interval that no voice signal is exchanged to exchange digital data, mute functions of the communication devices UE_x and UE_y can further be activated accordingly. As a result, the communication devices UE_x and UE_y can exchange digital data when the mute functions are activated, so as to achieve functions of communication fee calculation, authentication, data exchanging, etc.

Figure 6:
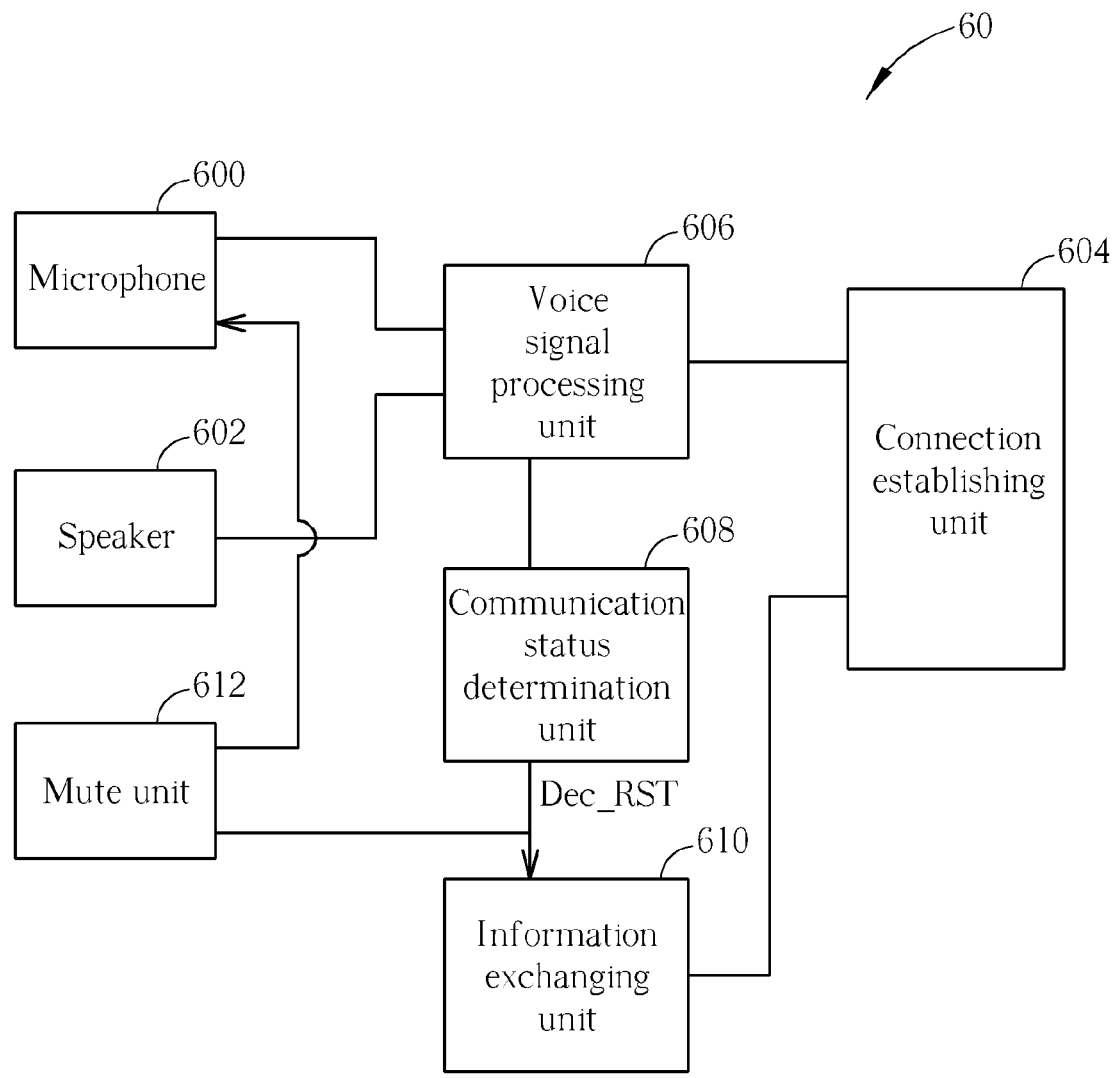
FIG. 6 is a schematic diagram of a communication device according to an embodiment of the present invention.

On the other hand, as to realization of the communication devices UE_x and UE_y, please refer to FIG. 6, which is a schematic diagram of a communication device 60 according to an embodiment of the present invention. The communication device 60 is utilized for realizing the communication device UE_x or UE_y, and includes a microphone 600, a speaker 602, a connection establishing unit 604, a voice signal processing unit 606, a communication status determination unit 608, an information exchanging unit 610 and a mute unit 612. The connection establishing unit 604 is utilized for establishing a communication connection with another communication device. After the communication connection is established, the voice signal processing unit 606 can transmit voice signals received by the microphone 600 to another communication device through the connection establishing unit 604, or emit voice signals, transmitted from another communication device to the connection establishing unit 604, through the speaker 602. The communication status determination unit 608 can determine a voice exchanging status between the connection establishing unit 604 and another communication device, to generate a determining result Dec_RST. The information exchanging unit 610 activates exchanging of digital data through the communication establishing unit 604 according to the determining result Dec_RST. Besides, the mute unit 612 can turn off the microphone 600 when the determining result Dec_RST indicates that the connection establishing unit 604 does not exchange voice signals with another communication device for a specific interval.

In a word, in the communication device 60, after the connection establishing unit 604 establishes the communication connection with another communication device, the communication status determination unit 608 can determine voice exchanging status according to operations of the voice signal processing unit 606, and generate the determining result Dec_RST to the information exchanging unit 610. If the determining result Dec_RST indicates that the connection establishing unit 604 does not exchange voice signals with another communication device for the specific interval, the information exchanging unit 610 activates exchanging of digital data and the mute unit 612 turns off the microphone 600. As a result, the communication device 60 can exchange specific information by exchanging digital data, to achieve functions of communication fee calculation, authentication, data exchanging, etc.

Noticeably, the communication device 60 shown in FIG. 6 is utilized for realizing the communication device UE_x or UE_y, and a designer can make modifications or alterations according to required functions. For example, the information exchanging unit 610 can utilize techniques of DTMF, FSK, etc. for performing data exchanging operations. Besides, the communication device 60 can further include a checking unit, for performing verification according to check codes transmitted by other communication devices, and responding an acknowledgement code accordingly. Detailed operations of communication fee calculation, authentication, data exchanging, etc. can be referred to the above, and are not narrated herein for clarity.

In the prior art, the user cannot determine dialed numbers are on-net or off-net, resulting in incapability of instant communication fee calculation and caller ID check, and leading to fraud calls and social problems. The present invention utilizes the interval that no voice signal is exchanged between the communication devices, to exchange digital data, so as to achieve functions of communication fee calculation, authentication, data exchanging, etc., and thus, enhance practicality and security during communication.

To sum up, the present invention utilizes the interval that no voice signal is exchanged after the communication connection is established to exchange digital data, to achieve functions of communication fee calculation, authentication, data exchanging, etc. Thus, the present invention improves problems caused by the current telecommunication network, and ensures practicality and security during communication.

Those skilled in the art will readily observe that numerous modifications and alterations of the device and method may be made while retaining the teachings of the invention.

What is claimed is:

1. A method for exchanging information during a call in a voice communication system, comprising:
 a first communication device of the voice communication system establishing a communication connection with a second communication device; and
 the first communication device exchanging digital data with the second communication device and automatically turning off a microphone of the first communication device, to achieve a specific function in a specific interval;
wherein the specific interval is an interval that the first communication device does not exchange voice signals with the second communication device;
wherein the specific function is a communication fee calculating function that calculates communication fee during the call and an authentication function that verifies an identity of a caller of the second communication device in order to decide whether the call should be continued.

2. The method of claim 1, wherein the first communication device utilizes an audio coding technology to exchange the digital data with the second communication device.

3. The method of claim 1, wherein the step of the first communication device exchanging the digital data with the second communication device, to achieve the specific function in the specific interval comprises:
the first communication device transmitting a control code for calculating communication fee to the second communication device, to activate the communication fee calculating function; and
the second communication device transmitting a region identification code to the first communication device according to the control code for calculating communication fee.

4. The method of claim 3, wherein the region identification code comprises a mobile country code and a mobile network code.

5. The method of claim 4, wherein the region identification code further comprises a check code, and the first communication device transmits an acknowledgement code back to the second communication device according to the check code.

6. The method of claim 3 further comprising the first communication device calculating a fee of communicating with the second communication device according to the region identification code of the second communication device.

7. The method of claim 1, wherein the step of the first communication device exchanging the digital data with the second communication device, to achieve the specific function in the specific interval comprises:
the first communication device transmitting a control code of authentication and a random number seed value to the second communication device, to activate the authentication function;
the second communication device generating an identification code to the first communication device according to the control code of authentication and the random number seed value; and
the first communication device verifying the second communication device according to the random number seed value and the identification code.

8. The method of claim 7, wherein the identification code comprises an authentication signature value, which is a result generated by the second communication device via performing an Message-Digest Algorithm 5 on the received random number seed and a second key value.

9. The method of claim 8, wherein the step of the first communication device identifying the second communication device according to the random number seed value and the identification code comprises:
the first communication device performing the Message-Digest Algorithm 5 on the random number seed value and a first key value, to generate a verification signature value; and
the first communication device comparing the authentication signature value with the verification signature value, to verify the second communication device.

10. The method of claim 9 further comprising when the authentication signature value conforms to the verification signature value, the first communication device determining that the second communication device is successfully authenticated and the authentication signature value does not conform to the verification signature value, the first communication device determining that the second communication device is not authenticated.

11. The method of claim 8, wherein the identification code further comprises a check code and the first communication device transmits an acknowledgement code back to the second communication device according to the check code.

12. The method of claim 1, wherein the specific function is a data exchanging function.

13. The method of claim 12, wherein the step of the first communication device exchanging the digital date with the second communication device, to achieve the specific function comprises:
the first communication device transmitting a control code for exchanging data to the second communication device, to activate the data exchanging function; and
the second communication device transmitting data to the first communication device according to the control code for exchanging data.

14. The method of claim 13, wherein data transmitted by the second communication device comprises a check code and the first communication device transmits an acknowledgement code back to the second communication device according to the check code.

15. A voice communication system, comprising:
a communication network; and
a plurality of communication devices, a first communication device of the plurality of the communication devices establishing a communication connection with a second communication device of the plurality of communication devices through the communication network, exchanging digital data with the second communication device and automatically turning off a microphone of the first communication device in a specific interval to achieve a specific function during a call after the communication connection is established;
wherein the specific interval is an interval that the first communication device does not exchange voice signals with the second communication device;
wherein the specific function is a communication fee calculating function that calculates communication fee during the call and an authentication function that verifies an identity of a caller of the second communication device in order to decide whether the call should be continued.

16. The voice communication system of claim 15, wherein the first communication device comprises:
the microphone, for receiving voice signals;
a speaker, for outputting voice signals;
a connection establishing unit, for establishing the communication connection with the second communication device;
a voice signal processing unit, coupled to the microphone, the speaker and the connection establishing unit, for transmitting the voice signals received by the microphone to the second communication device through the connection establishing unit, or emitting voice signals transmitted from the second communication device to the connection establishing unit through the speaker;

a communication status determination unit, coupled to the voice signal processing unit, for determining a voice exchanging status between the connection establishing unit and the second communication device, to generate a determining result;

an information exchanging unit, coupled to the communication status determination unit and the connection establishing unit, for activating exchanging the digital data according to the determining result; and a mute unit, coupled to the communication status determination unit and the microphone, for automatically turning off the microphone when the determining result indicates that the connection establishing unit does not exchange voice signals with the second communication device for the specific interval.

17. The voice communication system of claim 16, wherein when the determining result indicates that the connection establishing unit does not exchange voice signals with the second communication device for the specific interval, the information exchanging unit exchanges the digital data with the second communication device through the connection establishing unit.

18. The voice communication system of claim 17, wherein the information exchanging unit utilizes an audio coding technology to exchange the digital date with the second communication device.

19. The voice communication system of claim 16, wherein the information exchanging unit is utilized for transmitting a control code for calculating communication fee to the second communication device, to request the second communication device to respond a region identification code.

20. The voice communication system of claim 19, wherein the region identification code comprises a mobile country code and a mobile network code.

21. The voice communication system of claim 20, wherein the region identification code further comprises a check code and the first communication device further comprises a checking unit, for transmitting an acknowledgement code back to the second communication device according to the check code.

22. The voice communication system of claim 19, wherein the first communication device further comprises a communication fee calculating unit, for calculating a fee of communicating with the second communication device according to the region identification code.

23. The voice communication system of claim 16, wherein the information exchanging unit is utilized for transmitting a control code of authentication and a random number seed value to the second communication device, to request the second communication device to respond an identification code.

24. The voice communication system of claim 23, wherein the identification code comprises an authentication signature value, which is a result generated by the second communication device via performing a Message-Digest Algorithm 5 on the received random number seed value and a second key value.

25. The voice communication system of claim 24, wherein the first communication device further comprises a checking unit, for performing the Message-Digest Algorithm 5 on the random number seed value and a first key value, to generate a verification signature value, and comparing the authentication signature value with the verification signature value, to verify the second communication device.

26. The voice communication system of claim 25, wherein when the authentication signature value conforms to the verification signature value, the checking unit determines that the second communication device is successfully authenticated and the authentication signature value does not conform to the verification signature value, the checking unit determines that the second communication device is not authenticated.

27. The voice communication system of claim 24, wherein the identification code further comprises a check code.

28. The voice communication system of claim 27, wherein the first communication device further comprises a checking unit, for transmitting an acknowledgement code back to the second communication device according to the check code.

29. The voice communication system of claim 16, wherein the information exchanging unit is utilized for transmitting a control code for exchanging data to the second communication device, to request the second communication device to respond corresponding data.

30. The voice communication system of claim 29, wherein the corresponding data comprises a check code.

31. The voice communication system of claim 15, wherein the first communication device further comprises a checking unit, for transmitting an acknowledgement code back to the second communication device according to the check code.

* * * * *